United States Patent
Hyatt

(12) 
(10) Patent No.: US 6,678,692 B1
(45) Date of Patent: Jan. 13, 2004

(54) HIERARCHY STATISTICAL ANALYSIS SYSTEM AND METHOD

(75) Inventor: Martin H. Hyatt, Sunnyvale, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 278 days.

(21) Appl. No.: 09/613,161

(22) Filed: Jul. 10, 2000

(51) Int. Cl.⁷ ................................................ G06F 17/30
(52) U.S. Cl. ........................... 707/102; 707/6; 715/514
(58) Field of Search ........................ 707/1–5, 100–102, 707/6; 715/514

(56) References Cited

U.S. PATENT DOCUMENTS

| | | | | |
|---|---|---|---|---|
| 5,204,958 A | * | 4/1993 | Cheng et al. | 707/102 |
| 5,251,129 A | * | 10/1993 | Jacobs et al. | 704/9 |
| 5,535,382 A | * | 7/1996 | Ogawa | 706/934 |
| 5,555,409 A | * | 9/1996 | Leenstra et al. | 707/101 |
| 5,557,794 A | * | 9/1996 | Matsunaga et al. | 707/3 |
| 5,787,426 A | * | 7/1998 | Koshiba et al. | 707/3 |
| 5,794,236 A | * | 8/1998 | Mehrle | 707/3 |
| 5,956,711 A | * | 9/1999 | Sullivan et al. | 707/3 |
| 5,987,460 A | * | 11/1999 | Niwa et al. | 707/4 |
| 6,009,439 A | * | 12/1999 | Shiomi et al. | 707/104.1 |
| 6,161,083 A | * | 12/2000 | Franz et al. | 704/4 |
| 6,185,576 B1 | * | 2/2001 | McIntosh | 707/200 |
| 6,385,611 B1 | * | 5/2002 | Cardona | 707/2 |
| 6,535,886 B1 | * | 3/2003 | Koontz | 707/102 |

* cited by examiner

*Primary Examiner*—Safet Metjahic
*Assistant Examiner*—Hanh B Thai
(74) *Attorney, Agent, or Firm*—Suzanne J. Heeg

(57) ABSTRACT

A search technique based on classification of database records in accordance with a predominant concept or feature, to facilitate searching of the database by specifying a concept rather than detailed textual or other content as a basis for searching. Each database record is processed prior to searching, to establish a key concept for the record (step 66, FIG. 3), and the concepts are defined in relation to a thesaurus-like hierarchy of concepts (46). For each database record, a key concept, or its location in the hierarchy is stored (68) in association with the database record, to facilitate later searching of the database using key concepts rather than textual or other specific content. An important aspect of the invention is determination of the key concept location for each database record, by computing a distance value for each node (steps 124, 126 and 128, FIG. 5), from a combination of coverage values (104) and anticoverage values (112), and then selecting (132) the node with the lowest distance value as the desired location of the predominant concept.

12 Claims, 6 Drawing Sheets

| NODE | DISTANCE "UP" | DISTANCE "DOWN" | UP + DOWN | UP+a(DN) a = 2 | UP+a(DN) a = 1.618 |
|---|---|---|---|---|---|
| A | 78 | 0 | 78 | 78 | 78 |
| B | 55 | 0 | 55 | 55 | 55 |
| C | 32 | 0 | 32 | 32 ↓ | 32 ↓ |
| D | 18 | 9 | 27 ↓ | 36 | 32.6 |
| E | 23 | 14 | 37 | 51 | 45.7 |
| F | 14 | 19 | 33 | 52 | 44.7 |
| G | 16 | 21 | 37 | 58 | 50.0 |
| H | 16 | 23 | 39 | 62 | 53.2 |
| I | 21 | 21 | 42 | 63 | 55.0 |
| J | 22 | 22 | 44 | 66 | 57.6 |
| K | 55 | 23 | 78 | 101 | 92.2 |
| L | 78 | 23 | 101 | 124 | 115.2 |
| M | 78 | 23 | 101 | 124 | 115.2 |
| N | 78 | 23 | 101 | 124 | 115.2 |

HIERARCHY STATISTICAL ANALYSIS SYSTEM AND METHOD

BACKGROUND OF THE INVENTION

This invention relates generally to analysis of data within a hierarchical structure and, more specifically, to analysis of textual data. Many computer users are familiar with textual searching techniques in which documents in a database are selected if they contain user-provided key words. Some textual search engines allow a user to specify key words or phrases in a Boolean combination, such as AND, OR, NOT or NEAR. Other, more advanced textual search engines may count the number of occurrences of specified words in an effort to locate more relevant documents for the user. Frequently, however, key word searching results in a large number of "hits" in documents that are of no interest at all to the user. The key words may be used in many documents in an incidental manner, or in a context that renders the documents of no interest. Hence documents of interest may be missed. The user must then review and discard these superfluous documents, or refine and repeat the search. The principal shortcoming of all key word searching techniques is that they are based on searching the literal form or expression of a document, without regard to context or the ideas or concepts expressed.

There has long been a need for a textual searching technique that allows a user to find documents based on content recognition, by matching selected concepts or ideas, rather than matching key words used in any context at all. The present invention satisfies this need and is also applicable to analyzing and searching non-textual data.

SUMMARY OF THE INVENTION

The present invention resides in a system and corresponding method for characterizing data samples in a hierarchical structure, which facilitates searching of the data based on hierarchical categories or features rather than specific data content. Briefly, and in general terms, the method of the invention comprises the steps of providing a hierarchy of features arranged in a thesaurus-like tree structure having nodes and branches, each node being representative of a feature in the hierarchy; identifying for each database record a plurality of key features that characterize the record; selecting, from the plurality of key features obtained in the identifying step, a node in the hierarchy corresponding to a predominant feature that best characterizes the database record; and associating the predominant feature and its position in the hierarchy with the database record. Database records are then accessible by their predominant features rather than by specific content.

More specifically, the step of selecting a node in the hierarchy corresponding to a predominant feature includes:

comparing each of the selected key features in the record with features in the hierarchy;

recording numbers of occurrences and their node positions for matches between key features of the record and features of the hierarchy;

and determining which node to select, based on whether the node is general enough to encompass a large proportion of the matches, but is not so general as to be too distant from the locations of the matches in the hierarchy.

Further, the step of determining which node to select includes:

computing a coverage value for each branch of the hierarchy, wherein the coverage value is given by a total of all matches recorded at nodes below and connected to the branch;

computing an anticoverage value for each branch of the hierarchy, wherein the anticoverage value is given by the difference between the total number of matches in the hierarchy and the coverage value for the branch;

and computing distance values for nodes of the hierarchy. The distance value for any node is a function of the coverage and anticoverage values of branches traversed between a top node and the node for which the distance value is computed. The node selected is the one with the lowest distance value.

Even more specifically, the step of computing distance values includes:

assigning a relatively large distance value to the top node of the hierarchy;

computing a distance value for a node that is connected to the top node through a branch, by reducing the top node distance value by the coverage value of the branch, and increasing the result by the anticoverage value of the branch multiplied by a factor 'a,' where 'a' is greater than unity;

and computing distance values for other nodes in the hierarchy in a similar manner, wherein the distance value for a node at the lower end of a branch is obtained by reducing the distance value of the node at the upper end by the coverage value of the branch, and increasing the result by the anticoverage of the branch multiplied by the factor 'a.'

Basically, distance values are computed for succession nodes beginning at the top of the hierarchy. After assigning a distance value to the top node, and also after computing a distance value for any other node; the method includes the additional step of selecting a maximum coverage branch to a next lower node for which a distance value will be computed. The branch selected has a larger coverage value than all other branches at an equal level in the hierarchy. Distance values need to be computed only for nodes along a path that traverses the maximum coverage branch through each level of the hierarchy.

The invention may also be defined as a system for classifying database records in accordance with a predominant feature. Briefly, and in general terms, the system comprises at least one thesaurus-like tree structure defining a hierarchy of features, the tree structure having nodes and branches, and each node being representative a feature in the hierarchy; a database of records, each of which is to be classified in accordance with a predominant feature; and a system processor coupled to the database of records and to the thesaurus-like tree structure. The system processor includes means for identifying for each database record a plurality of key features that characterize the record, means for selecting from the plurality of key features a node of the hierarchy corresponding to a predominant feature that best characterizes the database record, and means for associating the predominant feature and its position in the hierarchy with the database record. Database records are then accessible by their predominant features rather than by specific content.

The means for selecting a node in the hierarchy corresponding to the predominant feature includes means for comparing each of the selected key features in the record with features in the hierarchy; means for recording numbers of occurrences and their node positions for matches between key features of the record and features of the hierarchy; and means for determining which node to select, based on whether the node is general enough to encompass a large proportion of the matches, but is not so general as to be too distant from the locations of the matches in the hierarchy. More specifically, the means for determining which node to select includes means for computing a coverage value for each branch of the hierarchy, wherein the coverage value is given by a total of all matches recorded at nodes below and connected to the branch; means for computing an anticoverage value for each branch of the hierarchy, wherein the anticoverage value is given by the difference between the total number of matches in the hierarchy and the coverage value for the branch; means for computing distance values for nodes of the hierarchy, wherein the distance value for any node is a function of the coverage and anticoverage values of branches traversed between a top node and the node for which the distance value is computed; and means for selecting the node with the lowest distance value.

In the system as disclosed, the means for computing distance values includes means for assigning a relatively large distance value to the top node of the hierarchy; and means for computing distance values for other nodes, first for a node that is connected to the top node through a branch, by reducing the top node distance value by the coverage value of the branch, and increasing the result by the anticoverage value of the branch multiplied by a factor 'a,' where 'a' is greater than unity. The means for computing distance values also computes distance values for other nodes in the hierarchy in a similar manner. The distance value for a node at the lower end of a branch is obtained by reducing the distance value of the node at the upper end by the coverage value of the branch, and increasing the result by the anticoverage of the branch multiplied by the factor 'a.'

The system as disclosed further comprises means for selecting a maximum coverage branch to a next node for which a distance value will be computed. The branch selected has a larger coverage value than all other branches at an equal level in the hierarchy, and distance values need to be computed only for nodes along a path that traverses maximum coverage branches.

The invention is also embodied in a method and corresponding system for classifying database documents in accordance with a predominant concept. The method comprises the steps of providing a hierarchy of concepts arranged in a thesaurus-like tree structure having nodes and branches, each node being representative of a concept in the hierarchy; identifying for each database document a plurality of key words that characterize the document; selecting, from the plurality of key concepts obtained in the identifying step, a node in the hierarchy corresponding to a predominant concept that best characterizes the database document; and associating the predominant concept and its position in the hierarchy with the database document. Database documents are then accessible by their predominant concepts rather than by specific textual content.

More specifically, the step of selecting a node in the hierarchy corresponding to a predominant concept includes the steps of comparing each of the selected key words in the database document with concepts in the hierarchy; recording numbers of occurrences and their node positions for matches between key words of the database document and concepts of the hierarchy; and determining which node to select, based on whether the node is general enough to encompass a large proportion of the matches, but is not so general as to be too distant from the locations of the matches in the hierarchy. The step of determining which node to select includes the steps of computing a coverage value for each branch of the hierarchy, wherein the coverage value is given by a total of all matches recorded at nodes below and connected to the branch; computing an anticoverage value for each branch of the hierarchy, wherein the anticoverage value is given by the difference between the total number of matches in the hierarchy and the coverage value for the branch; and computing distance values for nodes of the hierarchy, wherein the distance value for any node is a function of the coverage and anticoverage values of branches traversed between a top node and the node for which the distance value is computed. The node selected is the one with the lowest distance value.

The step of computing distance values includes the steps of assigning a relatively large distance value to the top node of the hierarchy; computing a distance value for a node that is connected to the top node through a branch, by reducing the top node distance value by the coverage value of the branch, and increasing the result by the anticoverage value of the branch multiplied by a factor 'a,' where 'a' is greater than unity; and computing distance values for other nodes in the hierarchy in a similar manner. The distance value for a node at the lower end of a branch is obtained by reducing the distance value of the node at the upper end by the coverage value of the branch, and increasing the result by the anticoverage of the branch multiplied by the factor 'a.' The method may also include the step of selecting a maximum coverage branch to a next node for which a distance value will be computed, wherein the branch selected has a larger coverage value than all other branches at an equal level in the hierarchy. Distance values need to be computed only for nodes along a path that traverses maximum coverage branches.

The invention may also be defined as a method for searching a database of records, each of which has been classified as best characterized by at least one predominant concept, the method comprising the steps of providing through a user interface a concept of interest in a thesaurus-like hierarchy of concepts; retrieving from the database, records that have been classified as best characterized by the concept of interest; and supplying the retrieved records to a user through the user interface. The step of providing a concept of interest may include browsing through the thesaurus-like structure, with the user interface, to locate and select the concept of interest. Alternatively, the step of providing a concept of interest may include providing key words that are of interest to the user, and determining the concept of interest from the key words. The method may also include the steps of reviewing the records supplied through the user interface, refining the search by changing the concept of interest after reviewing the records supplied, and repeating the search.

It will be appreciated from the foregoing that the present invention represents a significant advance in the field of database searching. Classifying database records in accordance with a predominant feature or key concept facilitates. searching by concept rather than specific content and reduces or eliminates superfluous search results obtained when searching is based on specific record content, such as textual content. Other aspects and advantages of the invention will become apparent from the following more detailed description, taken in conjunction with the accompanying drawings.

DESCRIPTION OF THE PREFERRED EMBODIMENT

Figure 1:
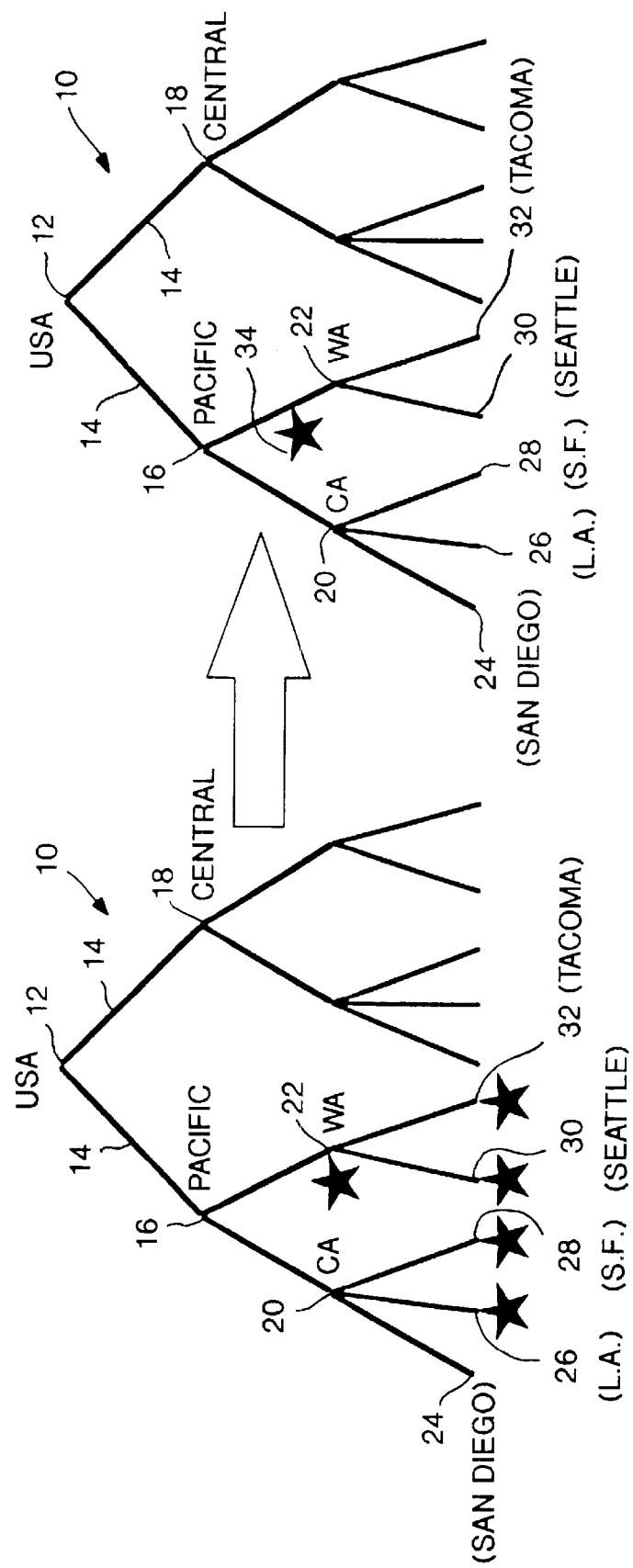
FIG. 1 is diagrammatic view of a hierarchy tree structure depicting how a document's concept location is found.

The invention will be described in the context of a textual data characterization and searching problem but it will be apparent that the invention is also broadly applicable to other data searching problems. As shown in the drawings by way of illustration, the invention pertains to a hierarchy analysis system and method that permits a user to retrieve data records, which are documents in the case of textual data, based on concepts or key features expressed in a hierarchical structure. In conventional searching of textual data, key words are specified by a user and a search is made of many documents in a data base to locate all the documents in which the key words appear. In some systems, the full text of the documents may be searched. To speed up the search process, documents may be pre-processed to extract key words or abstracts, which are searched instead of the full text. In either case, the search process usually yields many superfluous documents containing key word occurrences or "hits" that are of no interest to the user. The user must then either review and discard the superfluous documents or narrow the search by specifying other key words, but the process is often time consuming and frustrating to the user.

In accordance with the present invention as applied to textual searching, documents stored in a database are first pre-processed to extract key words, and then the key words from each document are analyzed to determine where the document best fits in relation to a thesaurus-like hierarchy. This pre-processing technique allows each document in the database to be characterized by one or more selected locations in the thesaurus-like hierarchy. Each selected concept location in the hierarchy characterizes a document in "concept space" because the location is close to a large proportion of key word "hits" in the hierarchy, and because the location is at a high enough level of abstraction to encompass a large proportion of the key word hits.

Key words in a document may be supplied with the document or may be generated by comparing the full text of the document with the thesaurus-like hierarchy. The numbers of hits in the hierarchy are analyzed to identify key words that accurately characterize the document, and to eliminate small numbers of hits, which probably pertain only to incidental use of the words.

Finding a document's concept location involves a trade-off between level of generality and encompassing a sufficiently high proportion of key words. As shown in FIG. 1, a concept hierarchy can be represented as an inverted tree structure, indicated generally by reference numeral 10, having a root at the top 12 of the structure as illustrated, and multiple branches (two of which are shown at 14) extending down from the top. Forks in the tree structure 10 are referred to as nodes, and there are as many nodes and branches as are needed to define concepts encompassed in the structure with increasing specificity as lower levels of the hierarchy are reached. For example, if the structure shown in FIG. 1 represents a geographical database of documents concerning the United States, then the top node 12 would be designated "United States." The next lower tier of nodes might be used to designate geographical regions. For example, two nodes 16 and 18 might be designated "Pacific Region" and "Central Region," respectively. The next level down could be used to represent states within each region, and the lower level shown at the bottom of the figure could be used to represent cities, or possibly counties, within each state. Suppose, for example, that nodes 20 and 22 are designated "California" and "Washington," respectively, and lower nodes 24, 26, 28, 30 and 32 are designated "San Diego," "Los Angeles," "San Francisco," "Seattle" and "Tacoma," respectively. A document is analyzed for concept location and is found to contain key word hits for nodes 22 (Washington), 26 (Los Angeles), 28 (San Francisco), 30 (Seattle) and 32 (Tacoma), as indicated by the stars in the left-hand portion of FIG. 1.

The right-hand portion of FIG. 1 illustrates an appropriate concept location, indicated as a star 34, for the document being analyzed. Categorizing the document in node 10 (United States) certainly encompasses all the key word hits, but the top category is far too general for most purposes. Categorizing the document in node 22 (Washington) is too narrow because it fails to include the hits in California cities. Intuitively, one can see that the appropriate concept category should be higher up the tree than Washington, but lower down than the United States. In the example as illustrated, node 16 (Pacific Region) would seem to be the best choice.

As indicated in the right-hand portion of FIG. 1, in which the star 34 is positioned below node 16, perhaps the best category is between node 16 and the states in the next lower nodes 20 and 22, but no node presently exists between node 14 and the next lower nodes. If the hierarchy were expanded to include a geographical designation between "regions" and "states," the document being analyzed might be positioned more accurately. Since all the hits at a city level are located right at the Pacific coast, appropriate sub-regional designations might be "coastal," "mountainous" and "desert." The present invention is not concerned with the possibility of expanding a hierarchy in this manner, but pertains in part to a system and method for automatically categorizing documents in terms of an existing hierarchy, such as the one shown in FIG. 1.

The example of FIG. 1 illustrates a concept categorization based on geographical classification. The same document might have key word hits in multiple hierarchies. For example, if the document deals with a technical issue, such as environmental pollution pertaining to the mentioned cities, the document will also be appropriately located in a concept hierarchy pertaining to environmental engineering, perhaps relating to the ocean.

Figure 2:
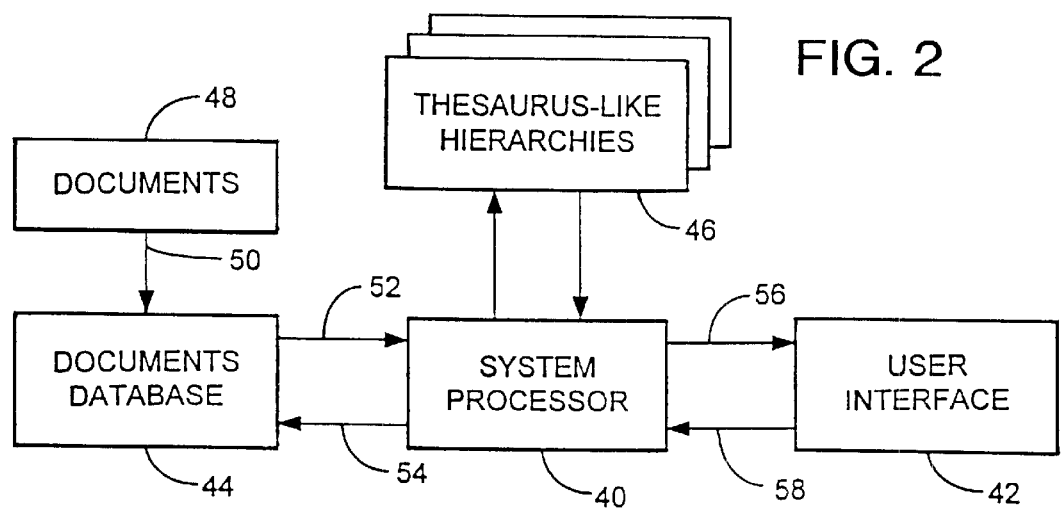
FIG. 2 is a block diagram of a system embodying the present invention.

FIG. 2 is a system block diagram showing principal components of apparatus implementing the invention, including a system processor 40, a user interface 42, and storage devices for holding a documents database 44 and multiple thesaurus-like hierarchies, indicated at 46. Documents 48 derived from various conventional sources are input to the documents database 44, as indicated by line 50. The system processor 40, which may be any appropriate high-speed computer system, retrieves documents from the database 44 for processing, as indicated by line 52, and stores concept locations associated with processed documents back in the database, as indicated by line 54. The user interface 42 interacts with the system processor 40, as indicated by lines 56 and 58, and allows a user to initiate a search of the database 44, either by providing key words or by selecting a location in the concept hierarchies 46 from which to retrieve documents.

Figure 3:
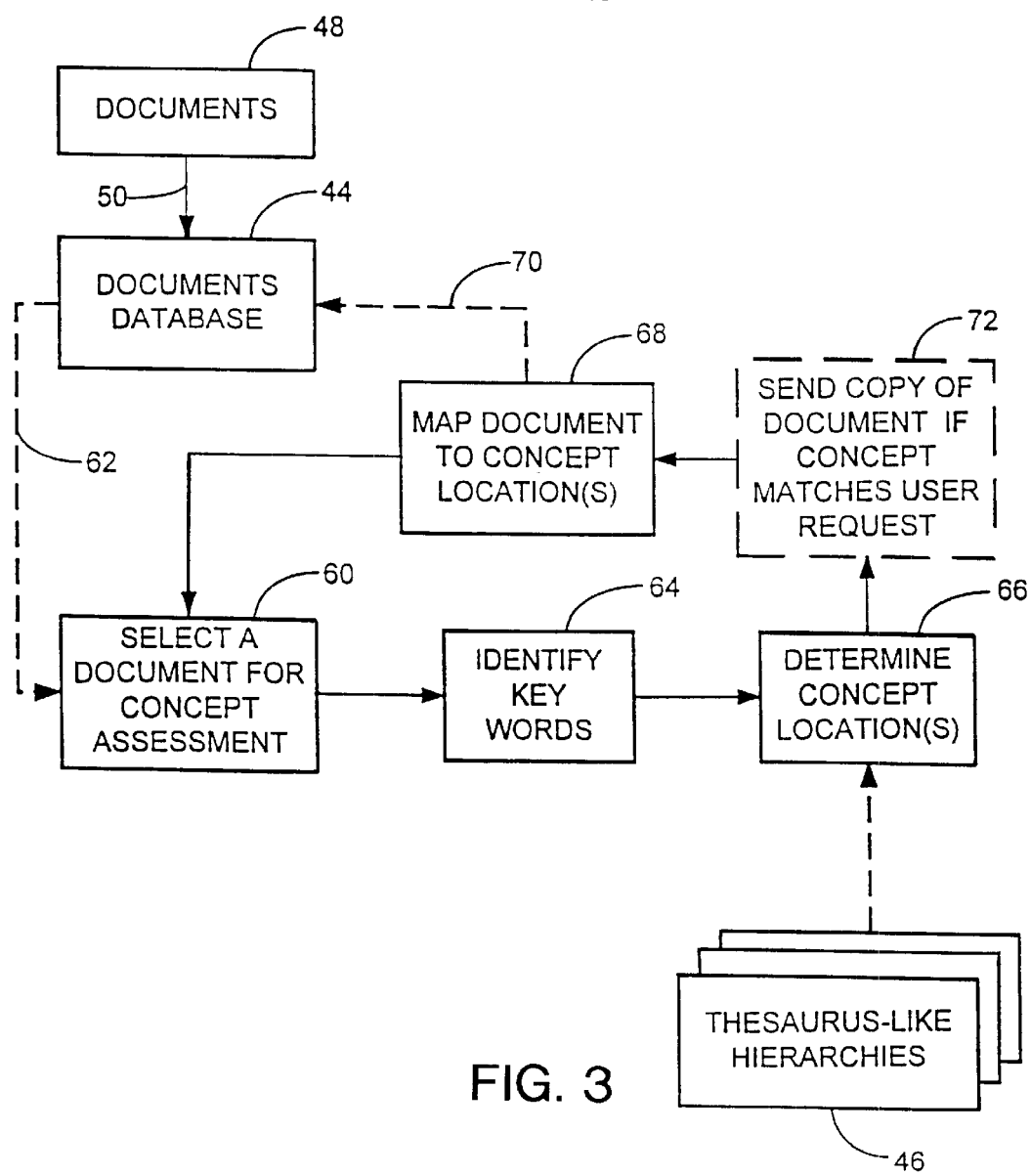
FIG. 3 is a flowchart depicting the functions performed in analyzing documents to determine their concept locations in relation to thesaurus-like hierarchies.

FIG. 3 is a flowchart depicting the principal functions performed in concept assessment of a document. A document is first selected for concept assessment, as indicated in block 60. The document may be retrieved from the database 44, as indicated by broken line 62, or directly from another source. The document is then scanned to identify key words that characterize the subject matter of the document, as indicated in block 64. This may be an independent process or key words may be identified by comparing the document text with words in the hierarchy structures 46.

The key words of the document are then used, as indicated in block 66, to determine an appropriate concept location, or locations, in the hierarchy structures 46. This is discussed in more detail below. The document is then "mapped" to the concept location or locations, as indicated in block 68. Mapping simply means that the selected concept location or locations are associated with the document, such as by storing the concept location or locations in the database 44 in association with the document, as indicated by broken line 70. Mapping the documents to concept locations allows document retrieval based on concepts instead of textual content. After each document is assessed to determine its concept location or locations, the process reverts to block 60 again, where a new document is selected for concept assessment.

Optionally, a user may make a request to receive newly processed documents pertaining to a particular concept. As indicated in block 72, once a concept location has been determined for a new document, the concept location may be compared with user requests of this type and, if a match is found, a copy of the document is delivered to the user.

Figure 4:
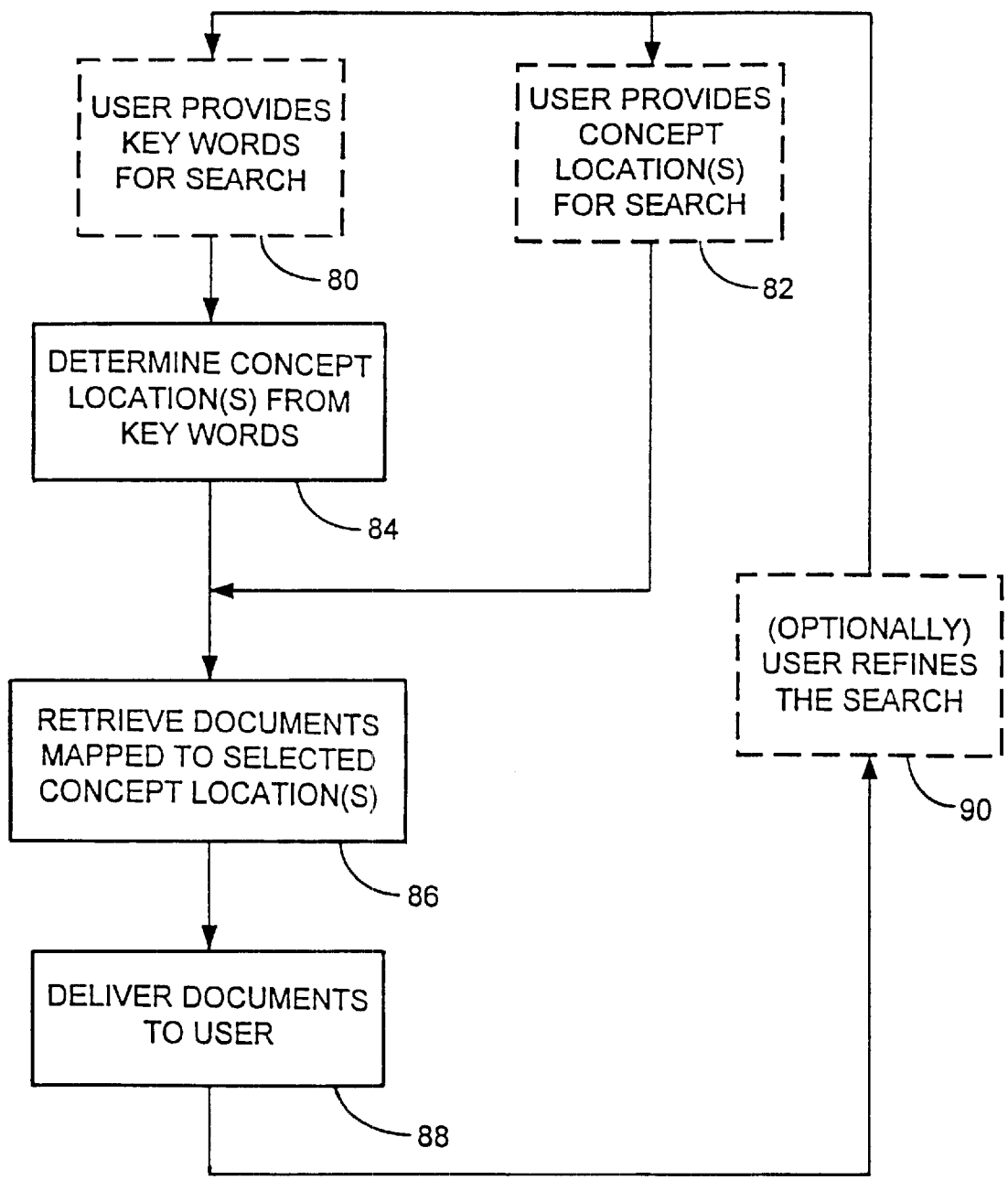
FIG. 4 is a flowchart depicting the functions performed in searching a document database that has been processed to categorize documents by concepts.

FIG. 4 is a flowchart depicting the principal functions performed in a search of the database 44 in which all the documents have been processed to map each of them to one or more concept locations in the hierarchy structures 46. A user wishing to initiate a search provides, through the user interface 42, either one or more key words, as indicated in block 80, or one or more concept locations, as indicated in block 82. If the user provides key words, the system first determines corresponding concept locations from the key words, as indicated in block 84. This is basically the same process that was used to determine a concept location for each document. The key words are compared with the hierarchy structures 46 and a concept location is selected that best characterizes the collection of key words.

Once a concept location is determined, or has been provided by the user, the system retrieves documents that have been mapped to the same concept location, as indicated in block 86, and delivers these documents to the user, as indicated in block 88. Inherent in the document delivery process is the conventional notion that documents will first be delivered by title, abstract, or other short summary, allowing the user to discard documents that are not relevant to the search. Then the full text of selected documents may be delivered to the user. Optionally, the user may refine the search based on the initially delivered results, as indicated in block 90, to repeat the search based on revised input key words or concepts.

A key feature of the invention the determination of a location, or locations, in concept space for each document in the database 44, such that the selected location or locations are truly representative of the document. In the simple example depicted in FIG. 1, a location is selected to have a sufficiently high level of abstraction to encompass most of the word "hits," and yet not be so general as to be too distant from the locations of the hits. Although this desired concept location may be intuitively obvious to a human observer of the hit locations in a hierarchy tree structure, a goal of the present invention is to define the selection process in such a way as to facilitate its implementation in a programmable processor. The following portion of this description explains this concept location selection process in detail.

Figure 5:
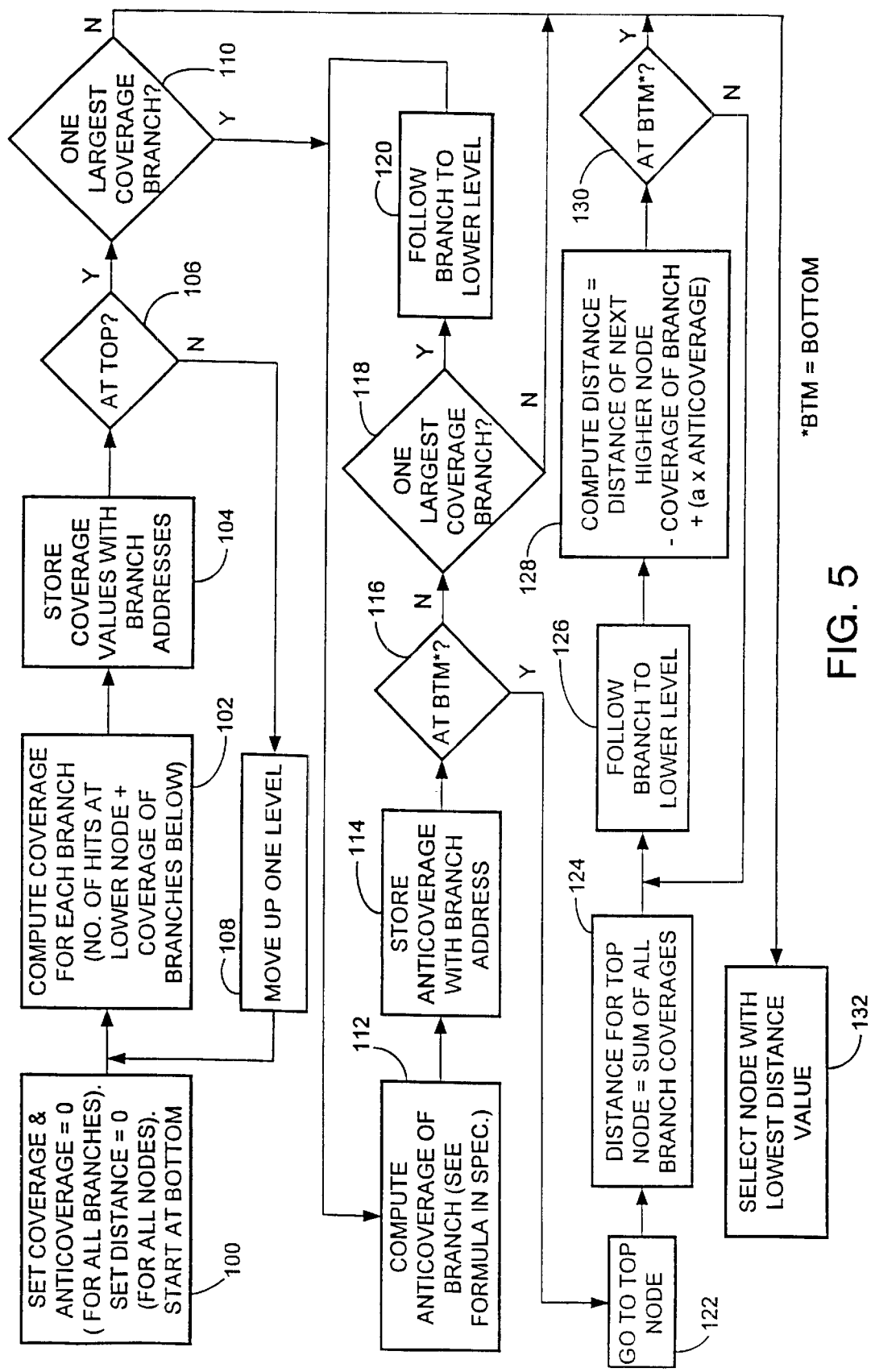
FIG. 5 is flowchart showing in more detail the functions performed in determining a concept location for a document.
Figures 6, 7:
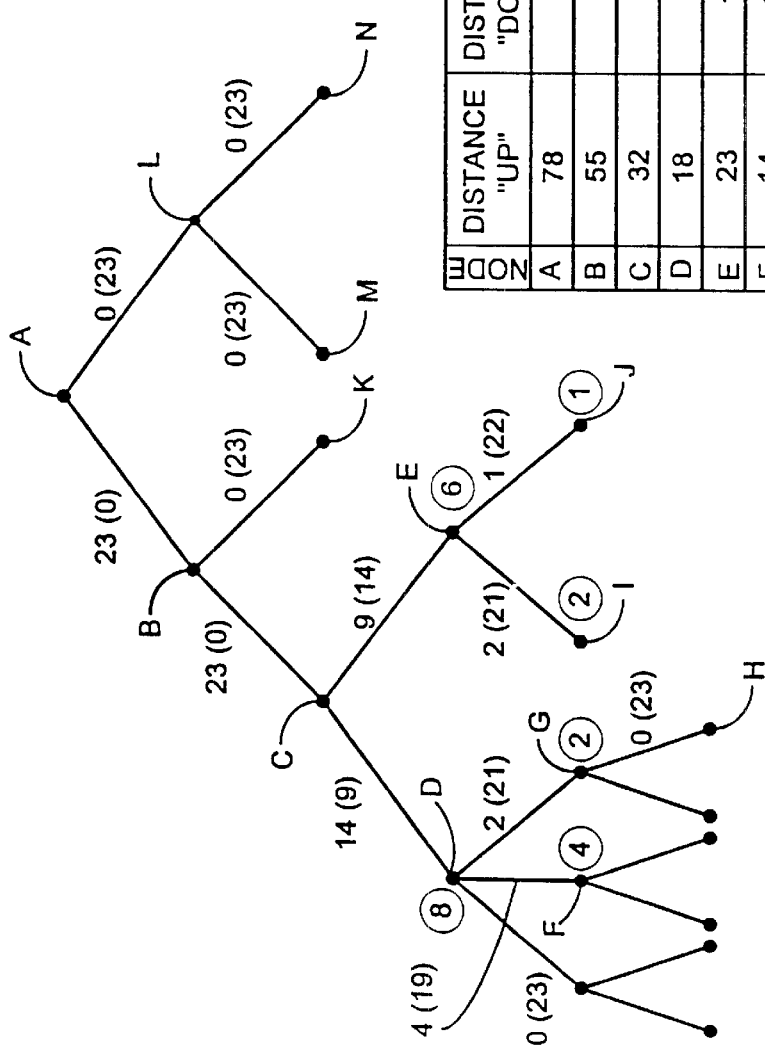
FIG. 6 is diagrammatic view of a concept hierarchy or thesaurus, providing a specific example of how concept location is determined in accordance with the process depicted in the flowchart of FIG. 5.
FIG. 7 is a table showing, for each node in the hierarchy of FIG. 6, computation of distance values using three different weighting factors.

FIG. 5 is a flowchart depicting the process for determining a concept location for a document. The functions shown in the flowchart are performed with respect to a concept hierarchy that has already been scanned to determine the locations of key word "hits" for a particular document. The broad step of determining a concept location, indicated in block 66 (FIG. 3), includes a preliminary step of comparing the document key words against the concept hierarchy. For purposes of illustration, FIG. 6 depicts a portion of a hierarchy structure that will be used in conjunction with the flowchart of FIG. 5 to describe how an appropriate concept location is determined. The hierarchy of FIG. 6 may be a geographical location hierarchy, or any other type of hierarchy, in which the concept nodes pertain to areas such as science and technology, politics, personnel organization, industry, government, military organization, and so forth. Regardless of the type of hierarchy involved, the procedure followed is the same. The hierarchy is scanned to record the numbers of key word hits at each node of the structure. Then the structure and the numbers or hits are analyzed using the process depicted in FIG. 5, to determine an appropriate concept location for the document. It will be understood that to identify the concept or concepts embodied in a document in an automatic manner requires applying the described procedure to multiple hierarchies or thesauri.

The process of automatically finding a concept location involves two quantities associated with each branch of the hierarchy. The branch quantities are "coverage" and "anticoverage," which will be defined shortly. A third quantity, "distance," is associated with each node in the hierarchy. The distance is computed for the top node first, and then for successively lower nodes, based on the coverage and anticoverage of the branches followed to reach the lower nodes.

The coverage of a branch is computed as the number of hits "covered by" the branch, i.e., the total of all the key word hits at nodes in the hierarchy that are positioned below the branch. Thus, the coverage of a branch at the bottom of the hierarchy is simply the number of hits, if any, at the node at the lower end of the branch. For a branch not at the bottom of the hierarchy, the coverage is equal to the sum of the coverage values of each of the branches descending from the node at the lower end of the branch.

The "anticoverage" of a branch is the sum of the anticoverage value of the next branch above this branch, the number of hits at the upper node of this branch, and the sum of the coverage values of each other branch descending from the upper node of this branch. The anticoverage of a branch is more simply expressed as the difference between total number of hits on the entire hierarchy and the coverage of the same branch. Thus if the coverage of a branch is C and the total number of hits on all nodes in the hierarchy is T, then the anticoverage of the branch is (T-C).

Coverage values increase as one ascends the hierarchy through nodes that have hits, and reach a maximum at an upper branch or branches. Coverage may be considered as providing a measure of distance "up" the tree structure. The word "up" is in shown in quotation marks as a reminder that the "up" direction is toward the root or trunk of the inverted tree structure. Anticoverage values increase as one descends the hierarchy through nodes that have hits, and reach maximum values in the branches where coverage is lowest. Anticoverage may be considered as providing a measure of distance "down" the tree structure. Some routes through the hierarchy, traversing nodes that have no hits, will have branches with zero coverage and maximum anticoverage, but these are in general ignored in the process to be described.

The first step in the process, indicated in block 100 in FIG. 5, is to initialize coverage and anticoverage values at zero for all branches in the hierarchy, and to set the distance values at zero for all nodes in the hierarchy. Initially, the process is set to consider branches at the bottom tier or level of the hierarchy.

The next step, described in block 102, is to compute coverage values for each branch on the current level. The coverage for a branch is computed as the number of hits at the lower node of the branch, plus the coverage values of all branches, if any, descending from the lower node. For the lowest level in the hierarchy, the coverage is, therefore, simply the number of hits, if any, at the lower node of the branch. Next the coverage values are stored in association with respective branch addresses, as indicated in block 104. If the top of the hierarchy has not been reached, as determined in block 106, the process "moves up" one level, as indicated in block 108, and continues processing, at block 102, for each of the branches on the next level up the hierarchy. This cycle of processing, through blocks 102, 104, 106 and 108, continues until the top of the hierarchy is detected in block 106. At this point, a coverage value is associated with every branch in the hierarchy.

The process described above and to be further described below requires that the topology of the hierarchy be stored as part of the hierarchy database. There are a number of conventional techniques for accomplishing this. Most simply, the nodes and branches can be assigned unique numbers or other "addresses." Associating each branch with upper and lower node numbers, or associating each node with the numbers of the branches connected to the node, defines the topology without ambiguity. By this or similar means, the process "knows" which level of the hierarchy is being processed and how to find appropriate nodes and branches to perform the computations described with reference to FIG. 5.

When the top of the structure is reached, as determined in decision block 106, the process next determines, as indicated in block 110, whether one of the branches descending from the top node provides the largest coverage of the branches. If, for example, the top node has two descending branches with equal coverage values, then the top node is probably the best selection of concept location, and computation of anticoverage values is not needed. If one branch from the top node has the largest coverage value, as determined in block 110, processing continues by determining the anticoverage values.

As indicated in block 112, next an anticoverage value is computed for the current branch. In the first pass through block 112, the branch for which the anticoverage is computed is the upper branch with the largest coverage value, as determined in decision block 110. The anticoverage for any branch may be computed in one of two ways. First, the anticoverage (AC) is given by the formula:

AC=AC of next higher branch (if any)+sum of coverage values of any other branches at current level+number of hits (if any) at upper node of this branch.

More simply, for any branch the anticoverage is equal to the difference between the total number of hits in the entire hierarchy and the coverage for the same branch.

As indicated in block 114, the anticoverage value is stored in association with the corresponding branch address. In decision block 116, the process determines whether the bottom level of the hierarchy has been reached. If not, the process considers the branch or branches below the one for which the anticoverage value was just computed, and determines whether any one of these. branches has coverage larger than the others, as indicated in block 118. If there is no single branch with the largest coverage, the analysis is terminated. If there is a branch with the largest coverage, this branch is followed to the next lower level, as indicated in block 120, the anticoverage of the branch is computed, as indicated in block 112, and the computed anticoverage value is stored in association with the branch address, as indicated in block 114. The process continues until the bottom of the hierarchy is reached, as determined in decision block 116. At this point, the process focuses on the top node of the hierarchy, as indicated in block 122, and distance values are computed for the nodes of interest in the hierarchy.

The distance value for the top node in the hierarchy is, by definition, the sum of the coverage values of all the branches in the hierarchy. Any suitably large distance value could be assigned to the top node. Using the sum of all coverage values ensures that, for convenience, no node will have a negative distance value. The process of the invention is, however, valid regardless of the distance value assigned to the top node. Block 124 indicates computation of the top node distance value as the sum of the coverage values of the branches. Next, the largest coverage value branch is followed to the next lower level node, as indicated in block 126. Then the distance value for this node is computed, as indicated in block 128. The distance value of the current node (other than the top node) is a function of the distance value of the next higher node and the coverage and anticoverage values of the branch immediately above the current node. Specifically, the distance value of the current node is computed as the distance value of the next higher node, minus the difference between the coverage and the product of the anticoverage and a selected constant multiplier, "a". When computing anticoverage values, the process followed a path from the top to the bottom of the hierarchy, taking a branch of maximum coverage value at each level. In computing distance values, the process follows the same path. Decision block 130 determines when the bottom of the hierarchy has been reached and all of the required distance values have been calculated. The process is completed by selecting the node with the lowest distance value, as indicated in block 133.

As described above, the process computes coverage values for all the branches in the hierarchy, but computes anticoverage and distance values for only selected branches and nodes, as determined by largest groupings of hits in the hierarchy. For purposes of explanation only, FIG. 6 shows the anticoverage values for all of the branches and the distance values for all of the nodes. It will be apparent from this example why it is not necessary to compute all of the anticoverage and distance values.

The hierarchy shown in FIG. 6 includes nodes indicated by reference characters A through N and other nodes not identified. Branches will be referred to in this discussion by the upper and lower nodes of the branches. For example, branch AB connects nodes A and B. Node A is the top node in the structure, nodes B and L are at the next lower level, and nodes C, K, M and N are at the third level from the top. Nodes C and K are connected by branches BC and BK to node B, and nodes M and N are connected by branches LM and LN to node L. Below node C are two nodes D and E on the next lower level. Connected to node E are two lower nodes I and J, and connected to node D are three lower nodes, two of which are nodes F and G. Nodes F, G, I and J are all on the same level, one position below nodes D and E. The lowest level in the hierarchy includes other nodes below nodes F and G, one of which is identified as node H.

The numbers of "hits" at each node are indicated by numbers in circles. Thus there were eight hits at node D, six at node E, four at node F, two at node G, two at node I and one at node J, for a total of twenty-three hits. The coverage of each branch is indicated by a numeral between zero and twenty-three, shown in proximity to each branch. The number in parentheses following each coverage value is the anticoverage value for the branch.

The coverage values are computed, as described above with reference to block 102 (FIG. 5), beginning with the lowest branches in the hierarchy. Since there were not hits below the level of nodes F, G, I and J, branches below this level, such as branch GH, will have a coverage value of zero. Branch DF has a coverage value of four, because there were four hits at the lower node F. Similarly, branch DG has a coverage of two, branch EI has a coverage of two and branch EJ has a coverage of one. At the next higher level, branch CD has a coverage computed from coverage values of the branches below (4+2), plus the number of hits at node D (8), for a total value of fourteen. Similarly, branch CE has a coverage value computed as the sum of the coverage values of branches EI and EJ (2+1) plus the number of hits at node E (6), for a total coverage value of fourteen. The coverage of branch BC is computed as the sum of the coverage values in branches CD and CE (14+9=23), and this coverage value also applies to the next higher branch (AB). Since there were no hits at nodes K, L, M or N, the coverage values for branches BK, AL, LM and LN are all zero.

The anticoverage value for each branch is the difference between the total number of hits (23) and the coverage value for that branch. Thus the anticoverage value for each branch of zero coverage value is twenty-three. It will be apparent that for the path of maximum coverage (A-B-C-D-F), the coverage values range from zero at the bottom of the hierarchy to a maximum (23) at the top branch. The anticoverage values along this path range from zero at the top to a maximum at the bottom level. In regions of the hierarchy where there are no hits, the coverage is zero and the anticoverage is a maximum.

FIG. 7 is a table showing how the corresponding distance values are computed for each of the nodes A through N in FIG. 6. In a practical implementation of the process described above, the distance values are computed only for nodes along the path A-B-C-D-F, but for purposes of explanation, distance and related values are shown for all of the nodes A through N. As described above, the distance value for the top node (A) is computed as the sum of all the coverage values for all the branches in the hierarchy. In this case, the sum of the coverage values is 78. For lower nodes, the distance value is computed as the distance value of the next higher node, minus the coverage of the intervening branch (between this node and the next higher node), plus the anticoverage of the branch multiplied by a factor "a." In the second column of FIG. 7, the distance "up" the hierarchy is shown. This is the first two terms in the expression for distance value, namely the difference between the distance value of the next higher node and the coverage of the intervening node. For node B, for example, this distance "up" is given by (78−23)=55. The distance "up" for any node can be thought of as a measure of coverage distance from the bottom of the hierarchy. Node A has the highest distance "up" by definition, and the nodes with the lowest distance "up" the hierarchy are node F and the nodes below it. The distance "down" the hierarchy, as shown in the third column of FIG. 7, is computed directly from the anticoverage values of the branches. The top node (A), of course, has a zero distance "down" the hierarchy. Because branches AB and BC have zero anticoverage values, nodes B and C also have a zero distance "down" the hierarchy. The distance "down" for node D is the anticoverage value of nine for the branch (CD) immediately above node D. Similarly, the distance "down" for node F is nineteen, and so forth.

The fourth column (included for illustration only) shows the sum of the distance "up" and the distance "down" for each node. In effect, this is the distance value for 'a'=1.0. The minimum distance value in this column is the value '27' for node D, as indicated by the arrow in the node D entry in this column. Selection of this node as the concept location for a document producing the hits shown in the hierarchy diagram, would clearly be inappropriate because it would not include the hits at nodes E, I and J. Intuitively, one can see that a more appropriate selection would be node C, which is general enough to encompass all the nodes with hits. Just as node D is too specific, higher nodes, such as nodes B or A, would be unnecessarily general.

The fifth column in FIG. 7 shows the effect of setting the factor 'a' at 2.0. This has the effect of increasing the distance value for each node by an amount equal to its distance "down" the hierarchy, i.e., by the anticoverage of the branch above the node. For a node with a higher distance "down" the hierarchy, the distance value will be increased more than for a node with a relatively lower, or zero, distance "down" the hierarchy. In this example, the distance values for nodes D, E and below are increased in distance value, but nodes A, B and C are unaffected. The result is that the position of the node with the lowest distance value is higher up the hierarchy. Specifically, node C has the lowest distance value (32), as indicated by the arrow in this column, and is selected as the concept location for the document being analyzed.

The last column shows the distance values computed using 'a'=1.618. Again, node C is selected as the concept location for the document, because node C has the minimum distance value (32). The factor 'a' may be varied for different types of subject matter in database hierarchies, based on experience in analyzing documents having subject matter of the different types. Currently, it appears that using a value of 'a' somewhere between 1.5 and 4.0 will yield acceptable results.

In accordance with the invention, node distance values from one level to the next are computed as a function of a coverage value and an anticoverage value for the branch that is traversed between the levels, but the anticoverage value is given more weight than the coverage value, by a selected factor ('a'). This asymmetry exerts an upward pressure on the location selection process, resulting in the selection of a more general concept location, as illustrated in the example discussed with reference to FIGS. 6 and 7.

Figure 8:
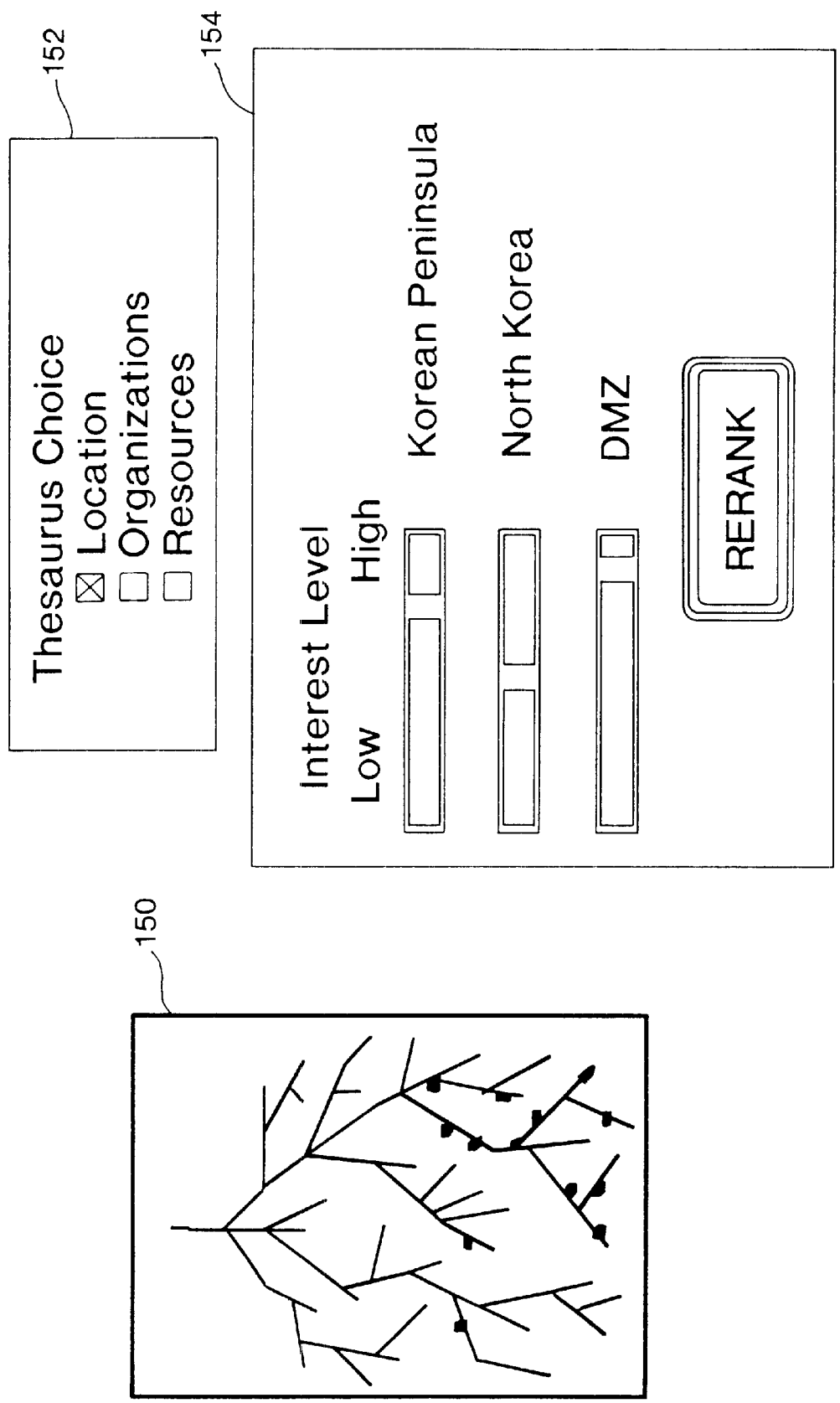
FIG. 8 is a diagrammatic view of a user interface for use in searching a database of documents in accordance with one aspect of the invention.

Searching a database that has been analyzed for concepts in accordance with the principles discussed above differs in some important respects from conventional textual searching using key words. Ideally, a user will specify an area of interest in terms of a designated concept, or concepts, that fit into an existing hierarchy or thesaurus. Suppose, for example, that the user is interested in finding documents that pertain to a location on the Korean Peninsula. The user first selects a "location" thesaurus, i.e., a thesaurus that contains associations with documents that have been categorized in terms of the geographic locations to which the documents pertain. The searching process ideally provides the user with a mechanism to browse through the location thesaurus on a user interface. The thesaurus may be presented in a textual form, similar to a menu structure, or in a graphical form that shows the tree structure of the thesaurus and provides the user with information about each node in the structure. FIG. 8 shows a user interface incorporating the latter type of thesaurus display, indicated at 150. Principal nodes of the thesaurus may be indicated right on the display, space permitting, and the user is provided with a mechanism to obtain more specific information about each node. One way to do this is to provide a supplementary "bubble" of information on the display when a mouse cursor is positioned on a node of interest. By moving the cursor across the tree structure, the user navigates through a selected thesaurus to find a node or nodes of particular interest. The thesaurus is selected in another region of the display, indicated at 152. When the user finds a node of interest, the user interface provides additional information about that node, such as a list of documents categorized at that node. The user can then browse through the documents mapped to the selected node, and select more in-depth information about any documents that appear to be of interest from their titles, dates or authors' names.

The user interface depicted also allows the user to specify an interest level in multiple nodes of the hierarchy, as shown in window 154 or the display. For example, the user may be interested in documents mapped to the "Korean Peninsula" node, the "North Korea" node and the "Demilitarized Zone (DMZ)" node. Using a scroll bar for each of the three nodes of interest, the user indicates a level of interest in each, ranging from "low" to "high." When the user actuates a "RERANK" button on the display, the documents mapped to the three nodes are ranked in accordance with the user-specified levels of interest. In a finely detailed hierarchy, the user may wish to retrieve not only documents from a single node of interest, but other documents from nearby nodes in the hierarchy. Documents retrieved from the node specified to be of interest will be given the highest rank, and documents from other nodes will be given lower rankings, dependent primarily on their proximity to the selected node of interest. These rankings are further weighted by the "level of interest" indications provided by the user. When the user changes these levels and actuates the RERANK button, the documents are reranked and presented for the user's more detailed analysis.

Mapping documents into multiple hierarchy structures provides a document database that can be searched in a number of different ways based on the concepts that the documents pertain to rather than textual content of the documents. It will be appreciated, however, that the invention is not limited to document database searching. The same principles may be applied to any application in which there is a desire to describe data existing within a hierarchical structure. For example, it may be useful to categorized hospital patients in terms of a hierarchical structure relating to predominant pathology. In this case, the "concept location" in the hierarchical structure is a disease category that best describes a patient's condition. Categorizing a patient in this manner can be achieved by scanning a patient chart and recording the "hits" achieved in the pathology hierarchy; and then determining the appropriate node in the hierarchy that best characterizes the patient's predominant pathology.

Another application example is the analysis of communication signals from multiple unknown sources. The signals may be analyzed in terms of various parameters, such as signal strength, directional location, frequency, bandwidth, modulation type and so forth. Any of these type categories may be used as the basis of a hierarchy structure to which multiple signals may be mapped in accordance with their predominant characteristics, the hierarchy then being used to facilitate analysis and searching of the multiple signals.

It will be appreciated from the foregoing that, although the invention has been described in detail for purposes of explanation, various modifications may be made without departing from the spirit and scope of the invention. Accordingly, the invention should not be limited except as by the appended claims.

What is claimed is:

1. A method for classifying database records in accordance with a predominant feature, the method comprising the steps of:

providing a hierarchy of features arranged in a thesaurus-like tree structure having nodes and branches, each node being representative of a feature in the hierarchy;

identifying for each database record a plurality of key features that characterize the record;

selecting from the plurality of key features obtained in the identifying step, a node in the hierarchy corresponding to a predominant feature that best characterizes the database record; and associating the predominant feature and its position in the hierarchy with the database record, whereby database records are then accessible by their predominant features rather than by specific content;

wherein the step of selecting a node in the hierarchy corresponding to a predominant feature, includes the steps of:

comparing each of the selected key features in the record with features in the hierarchy;

recording numbers of occurrences and their node positions for matches between key features of the record and features of the hierarchy; and determining which node to select, based on whether the node is positioned to encompass a desired proportion of the matches;

wherein the step of determining which node to select includes the steps of:

computing a coverage value for each branch of the hierarchy, wherein the coverage value is given by a total of all matches recorded at nodes below and connected to the branch;

computing an anticoverage value for each branch of the hierarchy, wherein the anticoverage value is given by the difference between the total number of matches in the hierarchy and the coverage value for the branch; and computing distance values for nodes of the hierarchy, wherein the distance value for any node is a function of the coverage and anticoverage values of branches traversed between a top node and the node for which the distance value is computed;
wherein the node to select is the one with the lowest distance value.

2. A method as defined in claim 1, wherein the step of computing distance values includes the steps of:
assigning a relatively large distance value to the top node of the hierarchy;
computing a distance value for a node that is connected to the top node through a branch, by reducing the top node distance value by the coverage value of the branch, and increasing the result by the anticoverage value of the branch multiplied by a factor 'a,' where 'a' is greater than unity; and
computing distance values for other nodes in the hierarchy in a similar manner, wherein the distance value for a node at the lower end of a branch is obtained by reducing the distance value of the node at the upper end by the coverage value of the branch, and Increasing the result by the anticoverage of the branch multiplied by the factor 'a.'

3. A method as defined in claim 2, wherein the step of computing distance values further includes the following step performed after assigning a distance value to the top node, and also performed after computing any distance value for any other node:
selecting a maximum coverage branch to a next node for which a distance value will be computed, wherein the branch selected has a larger coverage value than all other branches at an equal level in the hierarchy, wherein distance values are computed only for nodes along a path that traverses maximum coverage branches.

4. A system for classifying database records in accordance with a predominant feature, the system comprising:
at least one thesaurus-like tree structure defining a hierarchy of features, the tree structure having nodes and branches, and each node being representative a feature in the hierarchy;
a database of records, each of which is to be classified in accordance with a predominant feature; and
a system processor coupled to the database of records and to the thesaurus-like tree structure, the system processor including means for identifying for each database record a plurality of key features that characterize the record, means for selecting from the plurality of key features a node of the hierarchy corresponding to a predominant feature that best characterizes the database record, and means for associating the predominant feature and its position in the hierarchy with the database record, whereby database records are then accessible by their predominant features rather than specific content;
wherein the means for selecting a node in the hierarchy corresponding to the predominant feature includes:
means for comprising each of the selected key features in the record with features in the hierarchy;
means for recording numbers of occurrences and their node positions for matches between key features of the record and features of the hierarchy; and
means for determining which node to select, based on whether the node is positioned to encompass a desired proportion of the matches;
wherein the means for determining which node to select includes:
means for computing a coverage value for each branch of the hierarchy, wherein the coverage value is given by a total of all matches recorded at nodes below and connected to the branch;
means for computing an anticoverage value for each branch of the hierarchy, wherein the anticoverage value is given by the difference between the total number of matches in the hierarchy and the coverage value for the branch;
means for computing distance values for nodes of the hierarchy, wherein the distance value for any node is a function of the coverage and anticoverage values of branches traversed between a top node and the node for which the distance value is computed; and
means for selecting the node with the lowest distance value.

5. A system as defined in claim 4, wherein the means for computing distance values includes:
means for assigning a relatively large distance value to the top node of the hierarchy; and
means for computing a distance values, first for a node that is connected to the top node through a branch, by reducing the top node distance value by the coverage value of the branch, and increasing the result by the anticoverage value of the branch multiplied by a factor 'a,' where 'a' is greater than unity;
wherein the means for computing distance values also computes distance values for other nodes in the hierarchy in a similar manner, and wherein the distance value for a node at the lower end of a branch is obtained by reducing the distance value of the node at the upper end by the coverage value of the branch, and increasing the result by the anticoverage of the branch multiplied by the factor 'a.'

6. A system as defined in claim 5, and further comprising:
means for selecting a maximum coverage branch to a next node for which a distance value will be computed, wherein the branch selected has a larger coverage value than all other branches at an equal level in the hierarchy, and wherein distance values are computed only for nodes along a path that traverses maximum coverage branches;
and wherein the means for selecting a maximum coverage branch is operative immediately after assigning a distance value to the top node, and also after computing a distance value for any other node.

7. A method for classifying database documents in accordance with a predominant concept, the method comprising the step of:
providing a hierarchy of concepts arranged in a thesaurus-like tree structure having nodes and branches, each node being representative of a concept in the hierarchy;
identifying for each database document a plurality of key words that characterize the document;
selecting from the plurality of key concepts obtained in the identifying step, a node in the hierarchy corresponding to a predominant concept that best characterizes the database document; and
associating the predominant concept and its position in the hierarchy with the database document, whereby database documents are then accessible by their predominant concepts rather than by specific content;
wherein the step of selecting a node in the hierarchy corresponding to a predominant concept, includes the steps of:
comparing each of the selected key words in the database document with concepts in the hierarchy;
recording numbers of occurrences and their node positions for matches between key words of the database document and concepts of the hierarchy; and determining which node to select, based on whether the node is positioned to encompass a desired proportion of the matches;

wherein the step of determining which node to select includes the steps of:

computing a coverage value for each branch of the hierarchy, wherein the coverage value is given by a total of all matches recorded at nodes below and connected to the branch;

computing an anticoverage value for each branch of the hierarchy, wherein the anticoverage value is given by the difference between the total number of matches in the hierarchy and the coverage value for the branch; and computing distance values for nodes of the hierarchy, wherein the distance value for any node is a function of the coverage and anticoverage values of branches traversed between a top node and the node for which the distance value is computed;

wherein the node to select is the one with the lowest distance value.

8. A method as defined in claim 7, wherein the step of computing distance values includes the steps of:

assigning a relatively large distance value to the top node of the hierarchy;

computing a distance value for a node that is connected to the top node through a branch, by reducing the top node distance value by the coverage value of the branch, and increasing the result by the anticoverage value of the branch multiplied by a factor 'a,' where 'a' is greater than unity; and computing distance values for other nodes in the hierarchy in a similar manner, wherein the distance value for a node at the lower end of a branch is obtained by reducing the distance value of the node at the upper end by the coverage value of the branch, and increasing the result by the anticoverage of the branch multiplied by the factor 'a.'

9. A method as defined in claim 7, wherein the step of computing distance values further includes the following step performed after assigning a distance value to the top node, and also performed after computing any distance value for any other node:

selecting a maximum coverage branch to a next node for which a distance value will be computed, wherein the branch selected has a larger coverage value than all other branches at an equal level in the hierarchy, wherein distance values are computed only for nodes along a path that traverses maximum coverage branches.

10. A system for classifying database documents in accordance with a predominant concept, the system comprising:

at least one thesaurus-like tree structure defining a hierarchy of features, the tree structure having nodes and branches, and each node being representative a concept in the hierarchy;

a database of documents, each of which is to be classified in accordance with a predominant concept; and a system processor coupled to the database of records and to the thesaurus-like tree structure, the system processor including means for identifying for each database document a plurality of key words that characterize the document, means for selecting from the plurality of key words a node of the hierarchy corresponding to a predominant concept that best characterizes the database record, and means for associating the predominant concept and its position in the hierarchy with the database document, whereby database documents are then accessible by their predominant concepts rather than by specific content;

wherein the means for selecting a node in the hierarchy corresponding to the predominant concept includes:

means for comparing each of the selected key features in the record with features in the hierarchy;

means for recording numbers of occurrences and their node positions for matches between key features of the record and features of the hierarchy; and means for determining which node to select, based on whether the node is positioned to encompass a desired proportion of the matches;

wherein the means for determining which node to select includes:

means for computing a coverage value for each branch of the hierarchy, wherein the coverage value is given by a total of all matches recorded at nodes below and connected to the branch;

means for computing an anticoverage value for each branch of the hierarchy, wherein the anticoverage value is given by the difference between the total number of matches in the hierarchy and the coverage value for the branch; and means for computing distance values for nodes of the hierarchy, wherein the distance value for any node is a function of the coverage and anticoverage values of branches traversed between a top node and the node for which the distance value is computed;

wherein the node to select is the one with the lowest distance value.

11. A system as defined in claim 10, wherein the means for computing distance values includes:

means for assigning a relatively large distance value to the top node of the hierarchy; and means for computing a distance values, first for a node that is connected to the top node through a branch, by reducing the top node distance value by the coverage value of the branch, and increasing the result by the anticoverage value of the branch multiplied by a factor 'a,' where 'a' is greater than unity;

wherein said means for computing distance values also computes distance values for other nodes in the hierarchy in a similar manner, and wherein the distance value for a node at the lower end of a branch is obtained by reducing the distance value of the node at the upper end by the coverage value of the branch, and increasing the result by the anticoverage of the branch multiplied by the factor 'a.'

12. A system as defined in claim 11, and further comprising:

means for selecting a maximum coverage branch to a next node for which a distance value will be computed, wherein the branch selected has a larger coverage value than all other branches at an equal level in the hierarchy, and wherein distance values are computed only for nodes along a path that traverses maximum coverage branches;

and wherein the means for selecting a maximum coverage branch is operative immediately after assigning a distance value to the top node, and also after computing a distance value for any other node.

* * * * *